UNITED STATES PATENT OFFICE.

WILLIAM ELMER, OF NEW YORK, N. Y.

IMPROVEMENT IN MANUFACTURING ILLUMINATING-GAS.

Specification forming part of Letters Patent No. 41,431, dated February 2, 1864.

*To all whom it may concern:*

Be it known that I, WILLIAM ELMER, M. D., of the city, county, and State of New York, have invented certain new and useful Improvements in the Process of Manufacturing Illuminating-Gas from Coal and other Gas-Stock; and I do hereby declare that the following is a full, clear, and exact description of my said invention and of the manner of practicing the same.

In order that the nature of the invention may be understood, it is expedient to make a brief statement of the usual process of manufacturing illuminating-gas, and of the results thereof.

Illuminating-gas is manufactured on a large scale by subjecting the gas-stock to destructive distillation at a high temperature, whereby the gas-stock is decomposed, a certain portion of it is converted into gas, another portion into vapors which pass off with the gas and can be condensed into a liquid form, and the remainder into a solid carbonaceous residuum. The process is generally conducted by charging the gas-stock—coal, for example—into retorts in which it is subjected to a red heat, and the mixture of gas and vapors passes from the retort through the "hydraulic main" and the "condenser," in which the greater part of the vapors is condensed in the form of coal-tar and naphtha, while the gas passes from them to the purifiers. The gas is a mixture of various carbides of hydrogen, the most valuable of which is olefiant gas, and the process is generally conducted, for purposes of economy, at the lowest heat at which this gas is formed. The liquid product is a mixture of various hydrocarbons and compounds of them, all of which, although containing a considerable amount of hydrogen, contain an excess of carbon when compared with olefiant gas, and the total amount of carbon contained in the liquid products obtained from a given quantity of coal is much greater than the amount of carbon existing in the illuminating-gas obtained from the same quantity of coal. The liquid product, being useless in the manufacture, is generally sold by the gas-manufacturers; but its marketable value is very small, so that the large quantities of carbon and the hydrogen remaining in it are practically lost to the gas-manufacturer. These liquid products are given off in greatest quantities during the commencement of the distillation of the gas-stock. As the operation proceeds their quantity diminishes until the gas-stock becomes exhausted of them. On the other hand, the illuminating-gas given off during the commencement of the distillation contains a larger proportion of olefiant gas than that given off toward the latter part of the operation. As the operation proceeds the lighter gaseous carbides of hydrogen increase in relative proportion to the product of olefiant gas until the illuminating-power of the gas produced is so low that it is not valuable to the gas-manufacturer. The process is then stopped and the solid residuum is withdrawn from the retort, although if the process were continued further a considerable quantity of these lighter carbides of hydrogen and of hydrogen could be obtained. Hence such of these gaseous products which could be obtained by continuing the operation, although containing much hydrogen, are practically lost to the gas-manufacturer, while those which are mixed with the olefiant gas during the latter part of the operation, being of low illuminating-power, deteriorate the product. The solid residuum remaining in the retort may be divided into two parts, one of which is coke, which is not attached to the retort, while the other part consists of carbon in a solid form, which is firmly attached to the retorts and appears to be formed by the decomposition of a part of the oily liquid products first given off by the gas-stock, or of some of the illuminating-gas first formed. This deposited carbon is not only lost to the gas-manufacturer, but is, in addition, a constant source of trouble, as it accumulates until it has to be removed from the retorts either mechanically or by burning it off by permitting air to draw into the empty hot retorts.

Now, the objects of this invention are to utilize the above-mentioned practically valueless liquid, gaseous, and solid products of the manufacture of illuminating-gas by transmitting them into illuminating-gas, (so that the carbon and hydrogen contained in them are rendered practically valuable to the gas-manufacturer,) and also to produce illuminating-gas of a higher illuminating-power than is usually obtained.

To this end the first part of this invention consists in the process of transmitting into illuminating-gas the liquid products obtained in the gas manufacture by decomposing them by heat in the presence of the light carbides of hydrogen or hydrogen given off by the gas-stock during the latter part of its distillation.

The second part of the invention consists in the process of manufacturing the gaseous carbide of hydrogen, called "acetylene," by decomposing liquid hydrocarbons at a high temperature in the presence of hot hydrogen, produced either by the decomposition of water in the same vessel in which the hydrocarbon is decomposed or produced in a separate vessel and introduced while highly heated into the vessel in which the hydrocarbon is decomposed.

The third part of the invention consists in the process of manufacturing acetylene by subjecting deposited carbon to a high temperature in the presence of hot hydrogen, produced by the decomposition of water in the same vessel in which the deposited carbon is contained or produced in a separate vessel and introduced while highly heated into the vessel containing the deposited carbon.

Although each of the above processes may be performed separately in a retort specially prepared for the purpose, it is practically advantageous to perform them all in the retort in which the gas-stock from which the products are obtained is distilled without removing the carbonaceous residuum. The mode of effecting this, when the invention is applied to the manufacture of illuminating-gas from English cannel-coal is as follows: The ordinary apparatus is employed and the following additions are made thereto: First, a vat is provided above the level of the retort to contain the liquid products to be used; second, a feed-pipe is applied to each retort for the purpose of supplying the liquid product from the vat thereto, and this feed-pipe is provided with a valve or conical screw-rod (such as is well known in the manufacture of rosin-gas) to regulate the supply; third, a steam-boiler is provided to generate steam, and a feed-pipe fitted with a valve is conducted from it to each retort, so that steam can be supplied thereto in regulated quantities; fourth, a portion of the discharge-pipe through which the products of the destructive distillation pass from the retort is made of glass, in the form of a globe, with nozzles to connect it with the remainder of the pipe, so that the presence of the vapor of water (if any escape decomposition) may be made sensible by the condensation of it upon the surface of the glass; fifth, a small gas-pipe with a burner and stop-cock is applied to each retort, or to the discharge-pipe thereof, so that the quality of the gas can be tested during the operation by burning it. As these additions to the ordinary apparatus for making coal-gas are so simple that they can be applied to the ordinary coal-gas apparatus by any gas-engineer, it is not deemed necessary to furnish drawings showing the complete apparatus.

The operation is as follows: The retort, being empty and hot, is charged with coal in the usual manner and closed, and the heat is regulated to produce the largest amount of olefiant gas that can be practically obtained from coal by the usual course of manufacture, as is well known by gas-manufacturers. The liquid products are carefully collected in a cistern, and are pumped up into the vat above the retort. As the operation proceeds the quality of the gas made in the retort is tested from time to time by burning it at the burner, and as soon as the appearance of the light indicates (by its deficiency in illuminating-power) that the product of olefiant gas is falling off the screw-valve for supplying the liquid product is partially opened, so that it is fed into the retort, and is therein decomposed in the presence of the light carbides of hydrogen and hydrogen given off by the gas-stock, the result of which is that these gases combine, in whole or in part, with the products of the decomposition of the liquid product to produce a large quantity of olefiant gas. This operation is continued as long as practicable, and the liquid product is fed to the retort as fast as it can be transmuted into illuminating-gas. The rate at which it can be fed is determined by the burning of the gas at the test-burner. When the liquid product is fed in too slowly the gas is deficient in illuminating-power. When it is fed in too rapidly the gas smokes in burning, so that a little practice on the part of the attendant will enable him to regulate the supply of liquid with facility and to stop the supply when the gas-stock ceases to give off any practical amount of the light carbides of hydrogen and hydrogen, because the greater part of the liquid then fed to the retort is vaporized and produces a dense smoke at the test-burner. At this stage of the operation the process which constitutes the first part of the invention is practically completed; but as the gases given off by the gas-stock do not contain sufficient hydrogen to supply the carbon of all the liquid product with the quantity required to transmute it into olefiant gas a considerable quantity of the liquid is left in the vat. The object of the ensuing stages of the operation is to utilize this residue and the solid deposited carbon in the retort by transmuting them into acetylene, which is a gaseous compound of hydrogen and carbon containing a larger proportion of carbon than olefiant gas, and burning with an intense white light exceeding that of olefiant gas in brilliancy. To this end the retort is opened and a quantity of metallic zinc, or of an equivalent material for decomposing water at a high temperature, is charged into the retort upon the carbonaceous residuum remaining therein. The quantity of zinc so charged should (for economy) be proportioned to the quantity of hydrogen required to convert the carbon of the remaining liquid and of the deposited carbon into acetylene. If zinc be used, about one and a half pound of metallic zinc is required for each fluid gallon of liquid remaining. If wrought-iron turnings be used, about two pounds of them are required for each gallon of liquid for this purpose. After the zinc or its equivalent is introduced the retort is closed and the heat is raised to whiteness. Steam is then permitted to flow into the retort by opening the valve or cock in the steam-pipe, and the feeding of the remaining liquid is recommenced. The liquid entering the retort is thereupon decomposed in the presence of the nascent highly-heated hydrogen produced by the decomposition of the steam by the zinc or its equivalent, and the heated hydrogen combining with the products of the decomposition of the liquid, and with the deposited carbon in the retort, produces acetylene, which passes from the retort in a gaseous state. The state of the operation is known by the products given off. If the steam be admitted too rapidly, a portion of it passes from the retort without being decomposed, and its presence is made apparent by the condensation of it upon the inner surface of the glass portion of the discharge-pipe, and if the liquid product be admitted too rapidly the gas produced smokes. When all the liquid is exhausted and the gas produced ceases to be practically illuminating the operation is stopped and the retort is opened, when it will be found (if the operation has been carefully conducted) that all the deposited carbon has been utilized. The residuum remaining in the retort is then withdrawn, a new charge of coal is inserted, and the operation proceeds as before.

In the foregoing description the liquid product used has been supposed to be that produced from the same charge, which remains in the retort until the liquid so produced is utilized; but it is clear that the liquid product of each charge of gas-stock may be fed to a succeeding charge, and it is believed the operation can be most conveniently conducted by allowing a small stock of the liquid products to accumulate, and then feeding to each retort at each charge a certain number of gallons of liquid, about equal to the quantity produced by one charge of gas-stock, varying the quantity so fed as the stock of liquid on hand increases or diminishes. The operation is facilitated by superheating the steam previous to its introduction into the retort by causing it to traverse a heated pipe. The gas produced passes from the discharge-pipe of the retort to the hydraulic main and condenser of the gas-works, and thence to the purifiers, from which it passes to the gas-holders. If, therefore, any portion of the liquid escapes transmutation and passes off with the gas in the form of a vapor, it is recondensed, and no loss ensues. If any bisulphide of carbon exists in the gas, it should be passed through lime heated to 400° Fahrenheit before being introduced into the gas-holders. As the gaseous products of the whole operation are mechanically mixed in the gas-holder, and as acetylene has a higher illuminating-power than olefiant gas, the average illuminating-power of the mixture obtained by the above-described mode of operation is considerably higher than that of ordinary coal-gas.

In practicing the process it is expedient to manufacture the illuminating-gas under the lowest possible pressure in the retort, as thereby a less quantity of deposited carbon is formed in the retort, to be subsequently transmuted into acetylene, and consequently the gas first given off by the gas-stock is richer in olefiant gas.

The invention is not confined to the manufacture of illuminating-gas from coal as the gas-stock, but is applicable also to the manufacture of illuminating-gas from other materials—such, for example, as bitumen, petroleum, naphtha, asphaltum, resin, and wood, the liquid products obtained from these materials, although less in quantity than that obtained from coal, being valuable sources of carbon and hydrogen, and being capable of transmutation into illuminating-gas by decomposition in the presence of highly-heated hydrogen or the nascent light carbides of hydrogen. Neither is the invention confined to the decomposition of the water in the illuminating-gas retort in which the hydrocarbon is decomposed or the deposited carbon contained, as hydrogen formed in a separate vessel and introduced while hot from that vessel immediately into the illuminating-gas retort will answer the purpose, and this plan of generating the hydrogen separately is advantageous whenever it is desirable to keep the solid product resulting from the decomposition of the water by a heated metal separate from the residuum in the illuminating-gas retort.

The second part of the invention is not confined to the manufacture of acetylene from the liquid products obtained in the manufacture of illuminating-gas, as other liquid hydrocarbons, whether liquid at ordinary temperatures or rendered so by heat or solution, can be transmuted into acetylene by conducting the process in an apparatus suited to the purpose by the same mode of operation.

The invention and the best mode of practicing it with which the inventor is acquainted being described, as above, what is claimed as the invention to be secured by Letters Patent is—

1. The process of transmuting into illuminating-gas the liquid products obtained in the gas manufacture by decomposing them by heat in the presence of the light carbides of hydrogen or hydrogen given off by the gas-stock during the latter part of its distillation, the said process being conducted substantially as above set forth.

2. The process of transmuting liquid hydrocarbons into acetylene by decomposing them at a high temperature in the presence of heated hydrogen produced by the decomposition of water, the process being conducted substantially as above set forth.

3. The process of transmuting deposited carbon into acetylene by subjecting it to a high temperature in the presence of heated hydrogen produced by the decomposition of water, the process being conducted substantially as above set forth.

In testimony whereof I have hereunto subscribed my name.

WILLIAM ELMER.

Witnesses:
B. ROBERROUX,
WM. D. BALDWIN.